United States Patent
Han et al.

(10) Patent No.: US 6,479,083 B1
(45) Date of Patent: Nov. 12, 2002

(54) PROCESS FOR MAKING PARTIALLY DIGESTED SOY PROTEIN-CONTAINING DRESSING

(75) Inventors: Xiao-Qing Han, Naperville, IL (US); Lori Michelle Kissner, Glenview, IL (US); Julie A. Simonson, Sun Prairie, WI (US)

(73) Assignee: Kraft Food Holdings, Inc., Northfield, IL (US)

( * ) Notice: Subject to any disclaimer, the term of this patent is extended or adjusted under 35 U.S.C. 154(b) by 0 days.

(21) Appl. No.: 09/713,052

(22) Filed: Nov. 15, 2000

(51) Int. Cl.[7] .............................. A23L 1/24; A23L 1/211
(52) U.S. Cl. .................... 426/46; 426/650; 426/656
(58) Field of Search ...................... 426/46, 44, 656, 426/634, 605, 602, 650, 589

(56) References Cited

U.S. PATENT DOCUMENTS

| | | | |
|---|---|---|---|
| 3,968,261 A | 7/1976 | Goodman | 426/98 |
| 4,163,702 A | 8/1979 | Rickert, Jr. | 204/181 T |
| 4,302,474 A | 11/1981 | Mikami et al. | |
| 4,304,795 A | 12/1981 | Takada et al. | 426/602 |
| 4,423,084 A | 12/1983 | Trainor et al. | 426/589 |
| 4,426,395 A | 1/1984 | Sakai et al. | 426/46 |
| 4,572,837 A | 2/1986 | Poole et al. | 426/564 |
| 4,687,739 A | 8/1987 | Sugisawa et al. | 435/69 |
| 4,826,702 A | 5/1989 | Hayashi et al. | 426/589 |
| 5,104,674 A | 4/1992 | Chen et al. | 426/573 |
| 5,213,968 A | 5/1993 | Castle et al. | 435/68.1 |
| 5,641,533 A | 6/1997 | Ambjerg Pedersen | 426/605 |
| 5,654,029 A | 8/1997 | Heeringa et al. | 426/589 |
| 5,683,737 A | 11/1997 | Erickson et al. | 426/601 |
| 5,716,801 A | 2/1998 | Nielsen et al. | 435/68.1 |
| 5,958,498 A | 9/1999 | Trueck et al. | 426/605 |
| 6,022,702 A | 2/2000 | Tsumura et al. | 435/68.1 |
| 6,024,990 A | 2/2000 | Kofoed et al. | 426/44 |
| 6,036,983 A | 3/2000 | Nielsen | 426/53 |
| 6,303,178 B1 * | 10/2001 | Tsumura et al. | 426/654 |

FOREIGN PATENT DOCUMENTS

| | | |
|---|---|---|
| JP | 550039725 | 3/1980 |
| JP | 57-16674 * | 1/1982 |

OTHER PUBLICATIONS

Adler–Nissen, "Enzymatic hydrolysis of proteins for increased solubility", *J. Agric. Food Chem.* 24: 1090–1096 Dec. 1976.

Smart et al., "Recent Development in the Microstructural Characterization of Foods", in *Characterization of Food—Emerging Methods*, A. G. Gaonkar, (ed)., Elsevier, Amsterdam, pp. 233–275 Jan. 1995.

* cited by examiner

*Primary Examiner*—Keith Hendricks
(74) *Attorney, Agent, or Firm*—Fitch, Even, Tabin, & Flannery

(57) ABSTRACT

A process for incorporating soy proteins in emulsions of edible oils is provided. Such emulsions include, but are not limited to, pourable and spoonable salad dressings. The process comprises treating a soy protein isolate with one or more protease enzymes in an enzymatic hydrolysis step to prepare a partial hydrolysis or digest of the soy protein. The hydrolysis step is carried out using an effective amount of protease enzymes selected for their effectiveness in hydrolyzing the soy proteins, and for the flavor profile provided in the final end product using the partially digested protein. The soy protein is hydrolyzed for a time and at a temperature effective to partially digest the soy protein isolate without developing adverse flavor characteristics in the partially digested isolate. Typically, the degree of hydrolysis or proteolysis of the soy protein is about 3 to about 30 percent, and more preferably, about 5 to about 15 percent. The dressings prepared with the partially hydrolyzed or digested soy protein do not exhibit the graininess, poor texture, or soy bean flavor normally associated with soy proteins.

18 Claims, 2 Drawing Sheets

(1 of 2 Drawing Sheet(s) Filed in Color)

A          B

A          B

US 6,479,083 B1

PROCESS FOR MAKING PARTIALLY DIGESTED SOY PROTEIN-CONTAINING DRESSING

FIELD OF THE INVENTION

The invention is generally directed to processes for utilizing soy proteins in food products made using emulsions of edible food oils and/or lipids. The present invention is especially directed to utilizing soy proteins in salad dressings and related products.

BACKGROUND OF THE INVENTION

Emulsions of edible food oils and lipids, water, emulsifiers, and various flavorings are commonly used as various forms of salad dressings and related food condiments or ingredients. Such emulsions also may be used to form whipped food products, spreads, and frozen dessert products. When used as salad dressings, such emulsions may take various forms, including pourable dressings and spoonable dressings. The pourable and spoonable dressings differ in oil/lipid and water content, as well as in the flavorings they contain. Pourable dressings typically have a relatively low oil and/or lipid content and low viscosity so that they can be dispensed in liquid form from a bottle or other container. Spoonable dressings typically have a relatively high oil and/or lipid content and viscosity and are dispensed in a thickened or semi-solid form.

One example of spoonable dressing emulsions are conventional mayonnaise products which are water continuous emulsions, containing not less than 65 percent by weight dispersed oil, based on U.S. FDA Standards of Identity. As naturally constituted, mayonnaise compositions employ egg yolk as an emulsifying agent to disperse the oil phase in the water phase. Mayonnaise products also commonly include other optional ingredients such as salt, sweeteners, spices, vinegar, and other flavor components. The oils in traditional mayonnaise products may be one or more edible vegetable oils such as soybean or safflower oil. Mayonnaise is generally understood to be sufficiently viscous as to be semi-solid and non-pourable.

A conventional mayonnaise generally may be prepared by combining ingredients such as those described above and premixing them. The resulting premix is transferred to an emulsifying apparatus which provides high shear rates, such as a colloid mill or a high pressure homogenizer. The high shear rate disperses the oil, with the effect of the emulsifying agent, into finely divided droplets to produce the oil-in-water emulsion. The high density of droplets contributes to the high viscosity and high yield strength of the resulting mayonnaise.

Other similar spoonable dressing include oil-in-water emulsions with less than 65 percent oil which are prepared using starches or other similar ingredients to stabilize the emulsified system. According to the U.S. FDA Standards of Identity, such salad dressing must contain at least about 30 percent vegetable oil and about 4 percent liquid egg yolk (or its equivalent).

Many other emulsion dressing products are known to employ lower levels of oil; still others have been developed in which little or no oil is found. Products with lower, yet still significant levels of oil utilize alternative emulsifying agents, bulking agents, fillers, and/or thickeners to assist in providing a stable emulsion system. In such compositions, as with other similar edible emulsions systems, it is considered a desirable and important characteristic to provide organoleptic properties, such as mouthfeel, viscosity, density, flavor profiles, and the like that are similar to mayonnaise type emulsions.

Mayonnaise products and other salad dressings with large amounts of oil and utilizing significant amounts of eggs as emulsifiers are often considered undesirable from a dietary aspect. The high level of oils and the presence of eggs provide a relatively high caloric content in the form of fats, and a source of undesirable amounts of cholesterol. Therefore, considerable effort have been devoted to developing salad dressings with reduced fat and cholesterol levels. Moreover, considerable efforts have also been devoted to preparing foods food ingredients that provide positive health benefits.

The health benefits of soybean proteins have been known for some time. These proteins provide good nutritional value and tend to lower blood cholesterol levels in humans. Soybean proteins, in addition, have recently been linked with a possible role in inhibiting cancerous tumor cells. Thus, efforts have been made to incorporate soy protein into a wide variety of different food products in view of those advantages. Moreover, the use of soybean proteins can provide effective emulsifiers, substitute fillers, and bulking agents that are relatively inexpensive and readily available.

It is typically difficult, however, to incorporate significant levels of soy protein into salad dressing products. Even with high pressure homogenization techniques, the direct addition of significant levels of soy proteins to emulsion products (e.g., salad dressings) can result in commercially unacceptable defects relating to texture and flavor. For example, the direct addition of significant levels of soy proteins into salad dressing products often results in gritty and grainy texture as well undesirable soybean flavor. Examples of efforts to utilize soy proteins in salad dressings include U.S. Pat. No. 4,163,808 (use of soy proteins as the sole or dominant emulsifier); U.S. Pat. No. 4,304,795 (use of soybean protein in a semisolid egg yolk-free dressing); and U.S. Pat. No. 4,426,395 (use of a partial hydrolyzate of alcohol denatured soybean protein as an emulsifier).

The invention provides a process for pre-treating soy proteins so that they can be more effectively incorporated in salad dressing products. As a result, the invention provides a low cost, effective ingredient in salad dressing products that is not only believed to be healthy to consume, but also permits a reduction in the amounts of oils and similar high fat, high calorie ingredients in salad dressings and related edible oil emulsions products. Moreover, the invention provides a soy protein with improved properties suitable for use in salad dressings and related products. Such improved properties include, for example, emulsifying, water holding, and fat binding characteristics.

SUMMARY OF THE INVENTION

The invention generally relates to a process for incorporating pre-treated soy protein products into emulsions of edible oils, such as, but not limited to, pourable and spoonable salad dressings. The invention may also be used for other related edible or emulsion products such as whipped desserts, spreads, frozen desserts, and the like.

The process comprises pre-treating a soy protein isolate with one or more protease enzymes in an enzymatic hydrolysis step to prepare a partial digest of the soy protein. The hydrolysis step is carried out using an effective amount of protease enzymes selected for their effectiveness in hydrolyzing the soy proteins, and for the flavor profile provided in the final end product using the partially digested protein. The soy protein is hydrolyzed for an amount of time and a temperature effective to partially digest the soy protein isolate without developing adverse flavor characteristics in the partially digested isolate. Typically, the degree of hydrolysis of the soy proteins is about 3 to about 30 percent, and more preferably, about 5 to about 15 percent. For purposes of this invention, the degree of hydrolysis can be determined using the method of Adler-Nissen ("Enzymatic hydrolysis of proteins for increased solubility," *J. Agric. Food Chem.* 24: 1090–1096 (1976)), which is hereby incorporated by reference.

The partially digested soy protein is then heated to a temperature sufficient to inactivate the protease enzymes. This step also may be utilized to inactivate or kill of any bacteria or other microorganism contamination of the protein digest mixture (e.g., a pasteurization step). The soy protein digest mixture may be used to directly prepare an edible oil/lipid and water emulsion, such as a salad dressing, or may be stored for preparing such products at a later time. When used to prepare salad dressing or edible oil emulsions, the soy protein digest is blended with oil or other lipid phase ingredients and with the water phase ingredients. During this blending step, the soy protein digest should be relatively uniformly dispersed through out the mixture.

The blended mixture is then homogenized or otherwise subjected to shear forces sufficient to disperse the oil/lipid phase in the water phase to form the desired emulsion. The resulting emulsions will include a first phase of edible oils and/or lipids, as well as any other hydrophobic components, dispersed through the second phase of water and hydrophilic components. In an important aspect of the invention, the viscosity of the soy protein containing emulsion typically will be comparable to similar conventional salad dressing emulsion products, and greater than comparable products made using unhydrolyzed soy proteins both immediately after the emulsification step as well as after about 24 hours storage under refrigeration conditions.

In another important aspect of the invention, the organoleptic properties of the soy protein containing emulsions of the invention further demonstrate texture and/or mouthfeel similar to conventional emulsions having a similar formula (except for the soy protein). Moreover, the present soy protein-containing emulsions have a substantially reduced bean-like flavor; indeed, in many cases, such bean-like flavor is not detectable.

In another aspect of the invention, the soy protein isolates are hydrolyzed using from about 0.02 to about 2.0 percent of the protease enzymes at a temperature of about 70 to about 150° F. for about 10 to about 300 minutes. In one aspect of the invention, the soy protein is hydrolyzed until the degree of hydrolysis of the soy proteins is about 3 to about 30 percent, and more preferably, about 5 to about 15 percent.

The protein digest is then heated to a temperature of about 160 to about 195° F. to inactivate the enzymes. The digested protein then is blended with an oil and other lipid phase, a water phase and additional sweeteners, flavorings, vinegar and other ingredients typical of a spoonable salad dressing. The blended mixture is then homogenized to form a relatively dense emulsion by dispersing the oil and/or lipid phase in fine droplets throughout the water phase to provide a viscosity to the mixture sufficient for use as a salad dressing. Typically, the particles size of this emulsion is about 0.5 to about 10 microns.

Thus, the process of the invention provides edible oil and/or lipid emulsion systems utilizing the dietary, health, emulsification, bulking, and other benefits of soy protein, but without the detrimental effects encountered when unhydrolyzed soy protein isolates are used in similar emulsions. The invention further provides a salad dressing in one aspect with a flavor profile, organoleptic characteristics, and viscosities at the time of preparation and after storage that is comparable to conventional spoonable salad dressings. Moreover, in some applications, the digested soy protein may provide improved emulsifying, water and fat binding, and holding properties.

DETAILED DESCRIPTION OF THE INVENTION

Figure 1:
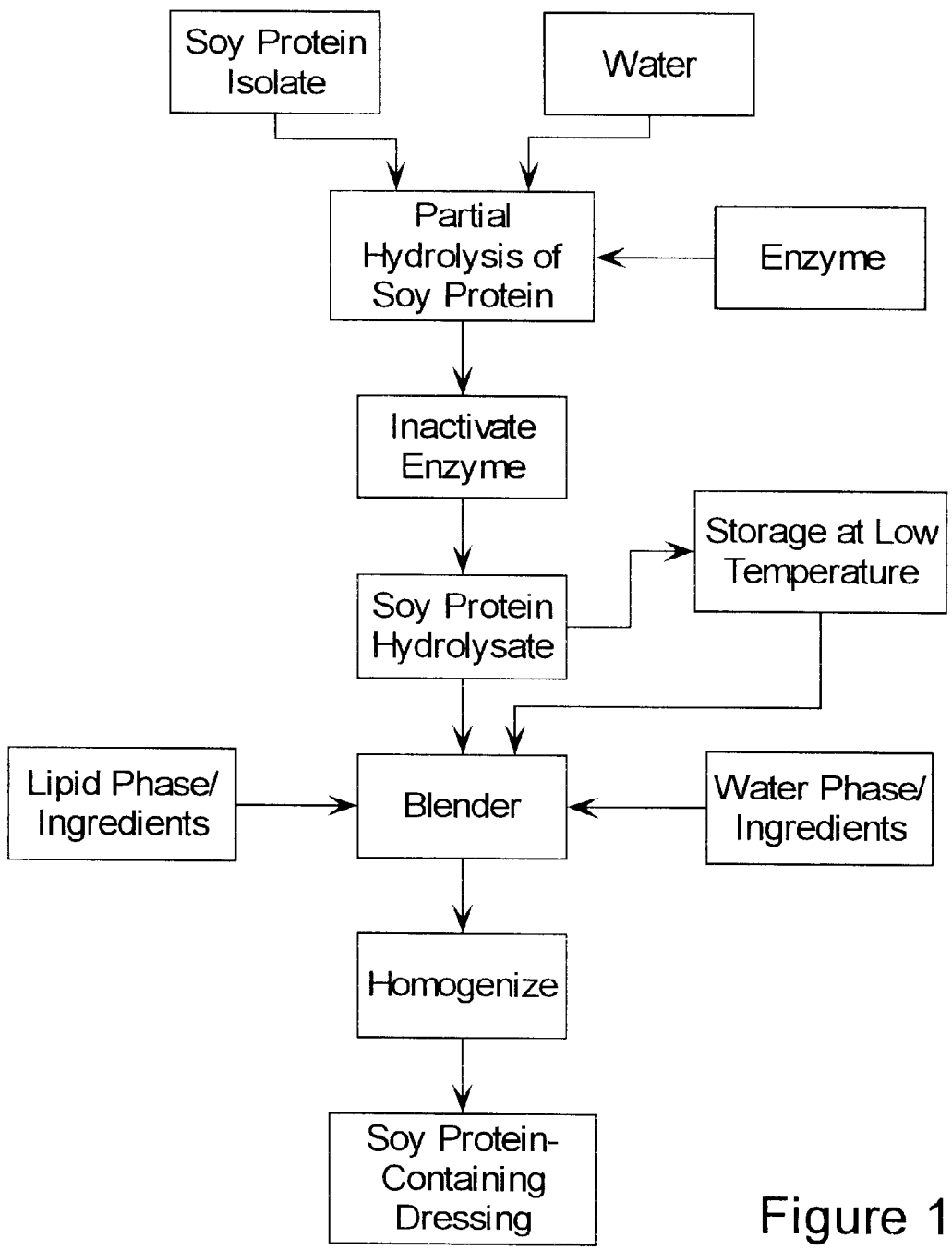
FIG. 1 is a flow diagram illustrating the steps of one aspect of the process of the invention.

In one aspect of the invention, a process is provided for improving emulsions of edible oils and other lipids and water, such as emulsion systems used in spoonable and pourable salad dressings. The invention in other aspects may also be applied to whipped toppings, spreads, frozen desserts, and other similar products that comprise emulsions of oils, lipids, and water. More generally, the present process provides for soy protein-containing dressings having smooth textures but not having significant be any flavor normally associated with soy beans. For purposes of this invention, "soy protein-containing dressings" include spoonable dressings, pourable dressings, whipped toppings, spreads, frozen desserts, and the like which contain significant levels of partially hydrolyzed soy protein. Preferably the soy protein-containing dressings of this invention are spoonable or pourable dressings.

The invention provides for the incorporation of soy protein isolates into such emulsions systems in significant quantities to enhance the nutritional content of the system by providing food components believed to lower blood cholesterol and, in some instances, inhibit the growth of certain cancer cells. Depending on the emulsion system and application, the added soy protein isolate may also provide improved physicochemical functions such as improved emulsification of the oil/lipid phase and water phase, improved water binding and holding properties of the emulsions, improved binding of fats/lipids in the system, among others.

The soy protein isolates useful in the present invention may be obtained by extraction from soy flours, defatted soy flakes, soy flours grits, soy protein concentrates, and other similar sources for soy protein isolates. Suitable soy protein isolates are commercially available from, for example, Protein Technologies International (St. Louis, Mo.), as well as others. Liquid, paste, slurry, or solid forms may be used.

Preferably, solids (e.g., powders or granules) or slurries thereof are preferred. A preferred solid soy protein isolate can be obtained from Protein Technologies International under the tradename FP 940.

Preferably, the solid soy protein isolate is mixed in sufficient hot water to disperse the isolate in the form of a slurry. A protease enzyme solution then is added to the soy protein isolate slurry, typically at a temperature of about 120° F., to partially hydrolyze the proteins. The amount of added enzyme generally is in the range of about 0.02 to about 2.0 percent based on the weight of the soy protein isolate. The amount of enzymes added will depend on the specific protease used, the desired rate and degree of hydrolyzation for the specific application, and the composition of the isolate used.

The enzyme solution typically contains one or more protease enzymes. Suitable examples of such enzymes include, but are not limited to, Promod 24L, Promod 194P, Promod 025P, Promod 278P, and Promod 298L (Biocatalysts Ltd., Mid Glamorgan, United Kingdom); Corolase PN-L (Rohm Enzyme, Somerset, N.J.); glutamyl endopeptidase, Alcalase, Neutrase, and Flavozyme (NOVO Nordisk, Bagsvaerd, Denmark); papain (e.g., Papain 600, Valley Research Inc., Hammond, Ind.); validase actinidin (Valley Research Inc., Hammond, Ind.); neutral bacterial protease (Medipharm AB, Kagerod, Sweden); Enzyco protease S-11562, Enzyco protease S-11650, Enzeco fungal protease concentrate-T, Enzeco alkaline protease-L-FG, and Enzeco bromelain (Enzyco, Inc., New York, N.Y.); (NOVO Nordisk); and the like. The enzymes further should be selected to avoid the production of bitter or unpleasant flavors or notes and/or other undesirable organoleptic qualities in the partially hydrolyzed isolate. Preferred protease enzymes include Promod 24L, Promod 194P, Promod 025P, Promod 278P, and Promod 298L (Biocatalysts Ltd., Mid Glamorgan, United Kingdom); Corolase PN-L (Rohm Enzyme, Somerset, N.J.); Flavozyme (NOVO Nordisk, Bagsvaerd, Denmark); and Validanse Actinidin (Valley Research Inc., Hammond, Ind.).

As mentioned above, the selection of the protease enzymes should include consideration of the flavor profile, organoleptic, and physicochemical characteristics provided by the reaction products of the protease and the soy protein isolate. In some instances, for example, certain protease enzymes will provide a bitter or other undesirable flavor profile to the partially hydrolyzed protein reaction products. Similarly, the improper choice of protease enzymes may result in the loss of viscosity characteristics of the end products. Generally, proteases which produce less bitter peptides are preferred.

After the mixing of the protease enzymes and the soy protein isolate, the mixture is maintained at a temperature and time sufficient to partially hydrolyze the soy protein. The proteolysis typically is carried out for about 10 to about 300 minutes, at temperature of about 70 to about 150° F. The proteolysis time will depended on the protein content of the mixture, the specific proteases used, the temperature, and the desired rate of the proteolysis. As noted above, the degree of hydrolysis or proteolysis is generally about 3 to about 30 percent, and more preferably, about 5 to about 15 percent.

In most instances, the proteolysis rates increase with increased temperatures, and a longer proteolysis period will result in a more complete hydrolysis of proteins in the mixture. The proteolysis temperature typically will be optimized to provide the desired reaction rate for the protease enzyme with the soy protein isolate, taking into consideration the thermal stability of the enzyme. Depending on the enzyme system used, it is preferable to monitor, and if necessary limit, the rate and degree of hydrolysis of the soy protein. In certain instances, a high degree of hydrolysis by certain enzymes will produce a bitter flavor and other undesirable characteristics in the reaction product, such as reduction in the viscosity of the emulsion products incorporating the hydrolyzed proteins.

Following the completion of the desired degree of protein hydrolysis, the enzyme and soy protein mixture is heated to temperatures sufficient to deactivate the protease enzyme system. The soy protein hydrolyzed in one aspect of the invention has the following characteristics: improved solubility, relatively low viscosity, clean flavor, no or low bitterness, and good emulsifying properties. The hydrolyzate can then be stored under refrigerated temperatures for later use or utilized to produce the edible oil/lipid emulsion, such as salad dressings of the present invention.

In one aspect of the invention, the heat deactivation step is carried out at a temperature and for a time that also is sufficient to pasteurize the soy protein hydrolyzed. For example, temperature of from about 150 to about 200° F. for about 5 to 60 minutes may be used to provide sufficient deactivation and/or destruction of bacteria, fungi, and spores to enhance the shelf life and microbiological stability of the hydrolyzed proteins, as well as products incorporating the hydrolyzed proteins.

To prepare the desired emulsions, in one aspect of the invention, the soy protein hydrolyzate is blended first with a predetermined amount of edible food oil and/or lipids to provide a protein stabilized emulsifying system. The amount of oils and/or lipids added to the hydrolyzate will depend on the desired emulsions product. As mentioned above, for example, spoonable salad dressings may have an oil/lipid content as high as about 80 percent. Other salad dressing products may contain much lower percentages of oils/lipids to reduce the caloric and fat content of the dressing. For example, a low-fat mayonnaise spread typically contains about 30 to about 40 percent fat or oil; a low-fat spread may contain about 33 percent or less fat or oil; and a fat-free mayonnaise spread may contain about 4 percent or less fat or oil. Still other salad dressings may have oil/lipid contents that provide a much lower viscosity, pourable product; generally, oil/lipids contents of about 5 to about 20 percent are preferred.

Following the oil/lipid addition, additional ingredients may be added to the blend such as water, buttermilk, flavorants, pH modifiers, starches, sweeteners, and other such components of the desired emulsion or dressing which are evenly dispersed through out the blend. The fully blended mixture is then homogenized at pressures and/or shear forces sufficient to fully emulsify the oil/lipid phase in the water phase of the product. The homogenization procedure can be carried out using any suitable food grade homogenizer, including multi-stage, high shear homogenizers (e.g., Dispax operating at about 1000 to about 2000 RPM). The resulting emulsion then may be mixed with any addition ingredients, if any, and packaged in suitable containers.

In one aspect of the invention further discussed in the Examples below, a spoonable salad dressing was produced pursuant to the process of the invention and compared to controls with similar ingredients of commercial salad dressings and salad dressing made with untreated, unhydrolyzed soy protein. The pH of dressing emulsion of the invention and the control dressing with soy protein were somewhat higher than the pH of the commercial control.

The initial viscosity of the salad dressing of the invention was very similar to that of the commercial control product, and was significantly higher than the initial viscosity of a control using unhydrolyzed soy protein isolates.

After 24 hours storage at about 40° F., the viscosities of the commercial control and the salad dressing emulsion of the invention remained substantially similar, although both demonstrated relatively small losses in viscosity. After 24 hours storage at about 40° F., the control dressing with unhydrolyzed soy protein similarly demonstrated a loss of viscosity and remained lower then the other samples.

The organoleptic properties of samples of the above mentioned salad dressing products were evaluated for organoleptic properties. The samples of the commercial control product and the product made by the process of the invention demonstrated an acceptable mouthfeel and flavor. The salad dressing of the invention, moreover, did not exhibit a grainy texture and/or soy bean taste in spite of the presence of the soy protein. The control sample incorporating unhydrolyzed soy protein isolate, on the other hand, demonstrated both an unacceptable grainy texture and soy bean flavor.

Figure 2:
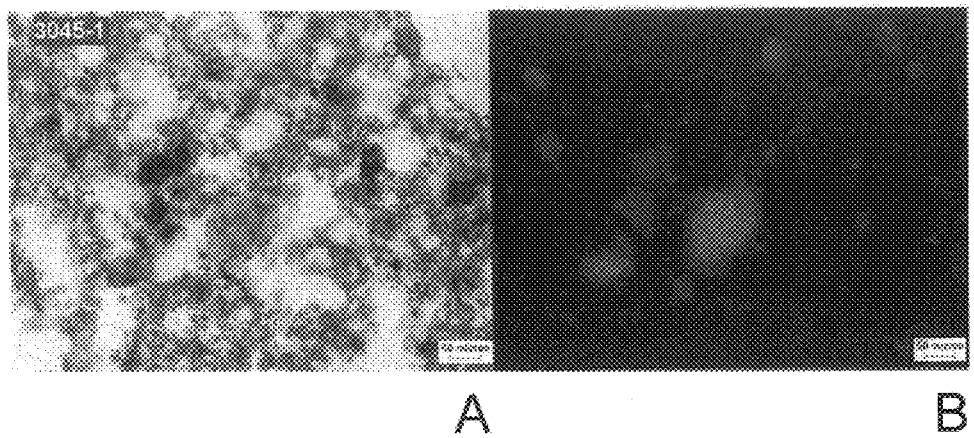
FIG. 2 provides photomicrographs illustrating the microstructure of salad dressing emulsions produced by the process of the invention. The fluorescence dye 1-anilino-8-naphthalene-sulfonic acid (ANS) was used. Panels A and B are essentially the same field taken using different settings. (Generally procedures for obtaining the photomicrographs can be found in Smart et al., "Recent Development in the Microstructural Characterization of Foods" in *Characterization of Food—Emerging Methods,* A. G. Gaonkar (ed.), Elsevier, Amsterdam, pp 233–275 (1995), which is hereby incorporated by reference.)
Figure 3:
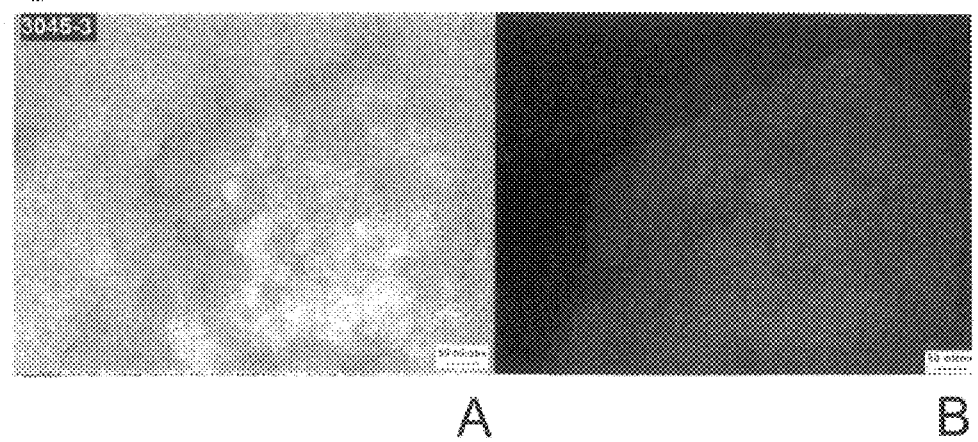
FIG. 3 provides photomicrographs illustrating the microstructure of control salad dressing emulsions produced using unhydrolyzed soy protein isolates. Panels A and B are the same as in FIG. 2.

The photomicrographs in FIG. 2 illustrate the microstructure of an inventive salad dressing product; the photomicrographs in FIG. 3 illustrate the microstructure of a control salad dressing product prepared using unhydrolyzed soy protein isolate. As shown in FIG. 2, the oils and lipids in the inventive salad dressing are evenly distributed throughout the emulsion. A dense dispersion of small droplets (i.e., about 0.5 to about 10 microns) is clearly shown, indicating effective and stable emulsion formation. The control salad dressing emulsion (FIG. 3) contained significantly larger oil and/or lipid droplets (i.e., about 0.5 to about 50 microns). Such larger particles suggest that the oil and/or lipid phase of the control emulsion is unevenly distributed in the water phase and that the emulsion may be unstable (i.e., likely to separate or manifest other undesirable properties over long storage periods).

EXAMPLES

The following examples are included to illustrate the invention, and not to limit it. Unless otherwise indicated, all percentages are by weight. The soy protein hydrolyzates were stored under refrigeration conditions until used to prepare salad dressing emulsions. Salad dressing emulsions were prepared using conventional techniques. Organoleptic evaluation was carried out using an untrained panel.

Example 1

A salad dressing emulsion of the invention was prepared by treating a soy protein isolate with a protease enzyme and then combining and homogenizing the partially hydrolyzed protein with the ingredients list below. The hydrolyzed soy protein was prepared as follows:

(A) Dissolve 666 g of soy protein isolate (FP 940 from Protein Technologies International, St. Louis, Mo.) in 2500 g of hot water (about 140° F.);

(B) Add 4.0 mL of a protease enzyme solution (Promod 24L, Biocatalysts Ltd., Mid Glamorgan, UK) to the soy protein slurry at about 120° F.;

(C) Incubate the mixture of soy protein isolate and protease enzymes for about 60 minutes at a temperature of about 120° F.;

(D) Heat the treated mixture to about 180° F. and hold for about 10 minutes to inactivate the protease enzyme; and (E) Store the soy protein hydrolyzate under refrigeration conditions. The resulting partially digested or hydrolyzed soy protein slurry had a moisture content of about 75.4 percent.

The hydrolyzate was then combined with conventional ingredients to form salad dressing emulsions using the following procedure:

(A) Prepare all components (i.e., wet spice mix, dry hoper mix, and emulsion) using the ingredients listed in Table 1;

(B) Add the components in the following order: Wet spices mix; dry hopper mix, partially digested soy protein isolate slurry, emulsion, and parsley;

(C) Blend the components for about 2 to about 20 minutes at about 70 to about 150° F.;

(D) Homogenize the blend at about 1500 psi; and (E) Package the product and store under refrigeration until evaluation.

TABLE 1

| Ingredients of Soy-Based Dressing | |
|---|---|
| Ingredients | Amount(%) |
| Wet Spice Mix | |
| | |
| Buttermilk | 15.0 |
| Phosphoric acid (80%) | 0.5 |
| Water | 23.2 |
| Salts | 1.7 |
| Granulated sugar | 3.0 |
| Vitamin E / Calcium disodium EDTA | 0.14 |
| Flavorants | 2.1 |
| Dry Hopper Mix | |
| | |
| Xanthan gum | 0.2 |
| Monsodium glutamate | 0.4 |
| Potassium sorbate | 0.34 |
| Spices | 0.3 |
| Emulsion | |
| | |
| Corn Syrup | 18.0 |
| Polysorbate 60K | 0.15 |
| Canola Oil | 6.0 |
| Vinegar | 3.5 |
| Partially Digested SPI Slurry | 25.5 |
| Parsley granules | 0.05 |

A first control was prepared using the same soy protein isolate prepared in a similar manner except that the protein isolate was not enzymatically hydrolyzed. A sample of commercial salad dressing was obtained with a similar formula as a second control; this commercial sample did not contain any soy protein.

Properties of the salad emulsion of the invention and the two controls are summarized in Table 2. No significant viscosity differences were observed between salad dressing incorporating the enzyme treated soy protein isolate and the commercial dressing control. However, the control dressing incorporating the non-enzyme treated soy protein isolate had a significantly lower viscosity (both immediately and after storage). Results of untrained panel test indicated that treatment of soy protein isolate with protease significantly improved organoleptic properties of the dressing of the invention in comparison to the control dressing incorporating the non-enzyme treated soy protein.

TABLE 2

Properties of Soy Protein Based Dressing Samples

| Property | Control (Commercial Product with No Soy Protein) | Control (No Enzyme Treatment of Soy Protein) | Inventive |
|---|---|---|---|
| pH | 3.8 | 4.5 | 4.8 |
| Acid (%) | 0.94 | 1.1 | 1.2 |
| Salt (%) | 2.4 | 2.3 | 2.5 |
| Immediate Viscosity* (cps) | $9.4 \times 10^3$ | $2.3 \times 10^3$ | $9.1 \times 10^3$ |
| Storage Viscosity** (cps) | $11.3 \times 10^3$ | $3.3 \times 10^3$ | $10.3 \times 10^3$ |
| Graininess | No | Yes | No |
| Beany Flavor | No | Yes | No |

*Immediate viscosity was determined immediately after sample preparation.
**Stored viscosity was measured after 24 hour at about 40° F.

Example 2

This example illustrates the use of various protease enzymes to prepare the soy protein isolates. Except for the specific enzymes used (which are listed in Table 3), essentially the same procedures were used as in Example 1.

TABLE 3

Proteases Enzymes

| Sample | Enzyme | Amount* |
|---|---|---|
| A | Promod 24L (Biocatalyst Ltd., Mid Glamorgan, UK) | 12 ml |
| B | Corolase PH-L (Rohm Enzyme, Somerset, NJ) | 12 ml |
| C | Neutral Bacterial Protease (NBP) S-11651 (Enzyme Research Development, Scranton, PA) | 12 ml |
| D | Validase Actinidin (Valley Research, Hammond, IN) | 12 g |

*Based on a total weight of 2543 g soy protein isolate.

The moisture contents of the hydrolyzed protein were in the range of about 70 to about 90 percent. The protein hydrolyzates were then used to make salad dressing products using the ingredients listed in Table 4 and essentially the same procedures as in Example 1.

TABLE 4

Ingredients Of Soy-Based Dressing

| Ingredients | Amount(%) |
|---|---|
| Wet Spice Mix | |
| Buttermilk | 15.0 |
| Phosphoric acid (80%) | 0.5 |
| Water | 7.7 |
| Salts | 1.7 |
| Granulated sugar | 3.0 |
| Vitamin E / Calcium disodium EDTA | 0.007 |
| Flavorants | 2.1 |
| Dry Hopper Mix | |
| Xanthan gum | 0.2 |
| Monsodium glutamate | 0.4 |
| Potassium sorbate | 0.34 |
| Spices | 0.3 |
| Emulsion | |
| Polysorbate 60K | 0.15 |
| Canola Oil | 15.0 |
| Vinegar | 3.5 |
| Partially Digested SPI Slurry | 50.0 |
| Parsley granules | 0.05 |

Properties of the dressing prepared using the soy protein isolates obtained with the various enzymes are summarized in Table 5. Among the proteases used, Actinidin was found to provide the most significant improvement on overall quality of the dressing prototypes prepared. The NBP treated soy protein isolate slurry had a very bitter taste and was not, therefore, used for preparing dressing samples.

TABLE 5

Characteristics Of Products Produced With Different Soy Protein Isolates

| | Soy Protein Isolates | | |
|---|---|---|---|
| Property | A | B | D |
| pH | 5.0 | 5.0 | 5.0 |
| Acid (%) | 1.16 | 1.03 | 1.06 |
| Salt (%) | 5.4 | 3.4 | 2.3 |
| Viscosity* (cps) | 5700 | 6156 | 8400 |

*Viscosity was measured after 24 hour at about 40° F.

As mentioned above, the process of the invention can be used to produce a variety of salad dressings and other emulsion-based food products such as whipped toppings, spreads, frozen desserts, and the like. The specific amounts of soy protein and the protease enzymes used to make such products will depend on the product composition and the methods for preparing the final emulsions. The above described aspects of the invention and examples should not be considered limitations on the invention and are only provided to illustrate certain of the advantages and benefits of the invention. They demonstrate and confirm the advantages of the process of the invention over other processes and products for producing edible oil and lipid emulsions with soy protein additions. The examples further illustrate the utility of the partially hydrolyzed soy isolates of the present invention in a variety of applications.

What is claimed is:

1. A process for making a soy protein-containing dressing, said process comprising:
   (1) adding one or more protease enzymes to soy proteins to form a first mixture;
   (2) heating the first mixture for a time and at a temperature effective to partially hydrolyze the soy proteins to form a second mixture;
   (3) heating the second mixture for a time and at a temperature effective to inactivate the one or more protease enzymes to form a partially hydrolyzed soy protein isolate;
   (4) adding edible oil and water to the partially hydrolyzed soy protein isolate to form a third mixture; and
   (5) homogenizing the third mixture for a time effective to provide the soy protein-containing dressing,
   wherein the soy protein-containing dressing contains about 20 to 50 percent partially hydrolyzed soy protein isolate, has a smooth texture and does not have significant be any flavor normally associated with soy beans.

2. The method of claim 1, wherein the protease enzymes are added at about 0.02 to about 2.0 percent based on the weight of the soy protein.

3. The method of claim 2, wherein the soy protein is partially hydrolyzed in the first mixture for about 10 to about 300 minutes at a temperature of about 70 to about 150° F.

4. The method of claim 1, wherein the partially hydrolyzed soy protein isolate from step (3) is stored at refrigeration temperatures for a period of time before being used to prepare the soy protein-containing dressing.

5. The method of claim 1, wherein the soy protein-containing dressing is a spoonable dressing.

6. The method of claim 1, wherein the soy protein-containing dressing is a pourable dressing.

7. A process for making a soy protein-containing dressing, said process comprising:

(1) providing a soy protein isolate containing soy proteins;

(2) mixing one or more protease enzymes to the soy protein isolate to form a first mixture;

(3) heating the first mixture for a time and at a temperature effective to partially hydrolyze the soy proteins present in the soy protein isolate and form a second mixture;

(4) heating the second mixture for a time and at a temperature effective to inactivate the one or more protease enzymes to form a partially hydrolyzed soy protein isolate;

(5) adding edible oils, lipids, sweeteners, flavorings, and water to the partially hydrolyzed soy protein isolate to form a third mixture;

(6) blending the third mixture; and (7) homogenizing the blended third mixture for a time effective to provide the soy protein-containing dressing, wherein the soy protein-containing dressing contains about 20 to 50 percent partially hydrolyzed soy protein isolate, has a smooth texture, and does not have significant be any flavor normally associated with soy beans.

8. The method of claim 7, wherein the protease enzymes are added at about 0.02 to about 2.0 percent based on the weight of the soy protein isolate.

9. The method of claim 8, wherein the soy proteins are partially hydrolyzed in the first mixture for about 10 to about 300 minutes at a temperature of about 70 to about 150° F.

10. The method of claim 9, wherein the partially hydrolyzed soy protein isolate from step (4) is stored at refrigeration temperatures for a period of time before being used to prepare the soy protein-containing dressing.

11. The method of claim 9, wherein the soy protein-containing dressing is a spoonable dressing.

12. The method of claim 9, wherein the soy protein-containing dressing is a pourable dressing.

13. A soy protein-containing dressing comprising:

an emulsified dressing having a first phase of edible oils and a second phase of water, wherein the first phase is dispersed as droplets having a size of about 0.5 to about 10 microns in the second phase; and about 20 to 50 percent partially hydrolyzed soy proteins dispersed in the emulsified dressing, wherein the partially hydrolyzed soy proteins are prepared by partial hydrolysis of soy proteins in a soy protein isolate using one or more protease enzymes; wherein the one or more protease enzymes are inactivated before the partially hydrolyzed soy proteins are incorporated into the emulsified dressing; and wherein the soy-containing dressing has a smooth texture and does not have significant be any flavor normally associated with soy beans.

14. The soy protein-containing dressing of claim 13, wherein the partial hydrolysis of the soy proteins is carried out for about 10 to about 300 minutes at a temperature of about 70 to about 150° F.

15. The soy protein-containing dressing of claim 13, wherein the soy protein-containing dressing is a spoonable dressing.

16. The soy protein-containing dressing of claim 13, wherein the soy protein-containing dressing is a pourable dressing.

17. The soy protein-containing dressing of claim 14, wherein the soy protein-containing dressing is a spoonable dressing.

18. The soy protein-containing dressing of claim 14, wherein the soy protein-containing dressing is a pourable dressing.

* * * * *

UNITED STATES PATENT AND TRADEMARK OFFICE
CERTIFICATE OF CORRECTION

PATENT NO.  : 6,479,083 B1
DATED       : November 12, 2002
INVENTOR(S) : Han et al.

It is certified that error appears in the above-identified patent and that said Letters Patent is hereby corrected as shown below:

<u>Title page,</u>
Item [73], Assignee, change "Food" to -- Foods --.

<u>Column 10,</u>
Line 64, after "contains" insert -- at least --.
Line 65, after "20" delete "to 50".
Line 67, change "be any" to -- beany --.

<u>Column 11,</u>
Line 39, change "be any" to -- beany --.

<u>Column 12,</u>
Line 25, change "be any" to -- beany --.

Signed and Sealed this

Eleventh Day of March, 2003

JAMES E. ROGAN
*Director of the United States Patent and Trademark Office*